(No Model.)
S. J. TUCKER.
PERCENTAGE CALCULATOR.
No. 291,817. Patented Jan. 8, 1884.
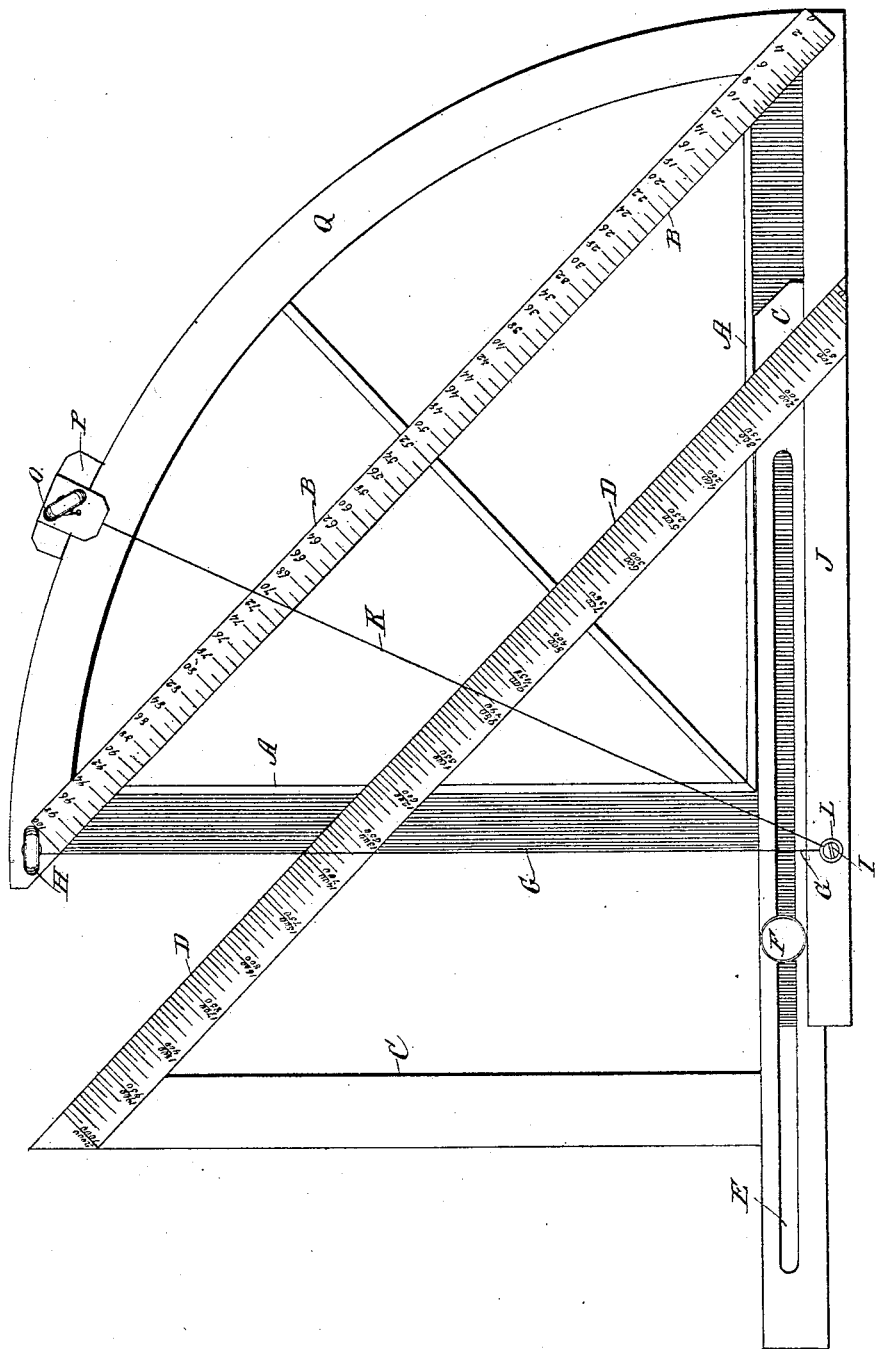
WITNESSES:
W. W. Hollingsworth
A. G. Lyne
INVENTOR:
S. J. Tucker
BY Munn & Co.
ATTORNEYS.

UNITED STATES PATENT OFFICE.

SYLVESTER J. TUCKER, OF RICHMOND, VIRGINIA.

PERCENTAGE-CALCULATOR.

SPECIFICATION forming part of Letters Patent No. 291,817, dated January 8, 1884.

Application filed November 17, 1883. (No model.)

*To all whom it may concern:*

Be it known that I, SYLVESTER J. TUCKER, of Richmond, in the county of Henrico and State of Virginia, have invented a new and useful Improvement in Percentage-Calculators, of which the following is a full, clear, and exact description, reference being had to the annexed drawing, forming part of this specification.

This invention relates to devices for reducing common fractions to decimals, to be used by railway and other transportation companies for determining percentages and proportions in dividing rates, revenues, or expenses on the basis of mileage; and the invention consists of the novel construction hereinafter described and claimed.

The drawing is a diagram of my improved calculator, in which A indicates a stationary triangle, having a percentage-scale, B, arranged along its hypotenuse; and C is a similar triangle, which is fitted to slide in the triangle A, and is likewise provided with a scale, D, arranged along its hypotenuse, which latter scale represents a series of numbers the percentage of which is to be ascertained. The numbers in the scales B and D increase in denomination from the right hand upward to the left hand, the former extending from 0 to 100 and the latter from 0 to 1,000, or from 0 to any number higher than 1,000, according to the value given to the graduations. If each graduation is made to count 2 instead of 1, the scale D will indicate 2,000 as the highest number. I have shown the scale D marked off to indicate both 1,000 and 2,000 at the termination of the scale, using two sets of numbers, one the double of the other, to mark the graduations. When the scale D is moved against the scale B, the graduations of the two will exactly register with each other, and the percentage numbers will correspond with the numbers whose percentage of one thousand or two thousand they (the former) represent. The movable triangle C is provided with a slot, E, and a set-screw, F, by means of which it may be adjusted with respect to the stationary triangle and held in any given position. The stationary triangle is provided at its left-hand side with a stretched cord, G, or equivalent device, which serves as a marker on the scale D. This cord is connected to set-screws H I on the triangle, and is arranged at right angles to the base J of the stationary triangle. A second cord, K, or equivalent device, is attached to a collar, L, which is loosely mounted on a screw, I, at the apex of the right angle of the stationary triangle, and is connected at its other end by a set-screw, O, to a slide, P, which moves on a segmental bar, Q, the circle of which is drawn from the pin I. One of the uses of the cord K is to mark the percentage on the scale B, and another use is to mark the numbers on both scales, as will be hereinafter explained.

The operation of the calculator is as follows: If it is desired to ascertain what is seventy per cent. of fourteen hundred, the scale D is moved out from the scale B until the cord G marks 1,400 on the upper edge of the scale D. The cord K is then moved to a position to mark 70 on the lower edge of scale B, in which position it will also mark 980 on the upper edge of scale D, as seventy per cent. of fourteen hundred. The same position of the cords as shown in the drawing also indicates 490 as seventy per cent. of seven hundred.

It is obvious from the above that if the percentage of several numbers aggregating fourteen hundred is desired, and 980 is one of those numbers, the percentage will be indicated by the cord K. In like manner the percentage which any part of fourteen hundred bears to the whole will be indicated on scale B by moving the cord K to a position to mark that part of fourteen hundred on the scale D. Such is the operation where an equal percentage is allowed to a given number—of railroads, for example; but where an "arbitrary" percentage is required by one of such roads this percentage must be deducted and the remainder divided equally among the remaining roads. In such case the cord K serves to mark the numbers on both scales. For instance, if one road requires thirty per cent. and the remaining seventy per cent. is to be divided equally among the remainder of a given number of roads, the cord K is to be moved to a position in which it will mark 70 on scale B. Now, if the sum total of miles in question is twelve hundred, and two hundred and twenty of these belong to the road requiring thirty per cent., two hundred and twenty are to be deducted from twelve hundred, and the movable triangle is to be moved outward until the remainder, 980, is marked on scale D by cord K. Then, if the cord K is moved to positions to mark on scale D the respective numbers of miles of the remaining roads whose sum total is nine hundred and eighty, the several proportions of seventy per cent. coming to the said remaining roads will be indicated on scale B by cord K.

What I claim is—

1. The combination of the stationary and the movable triangles having graduated scales and numbers, as described, and the movable marker, substantially as shown and described.

2. The combination of the stationary and the movable triangles having graduated scales and numbers, as described, and the movable marking-cord and segmental guide for the same, substantially as shown and described.

3. The combination of the stationary and the movable triangles having graduated scales and numbers, as described, and the movable and the stationary markers, substantially as specified.

4. The combination, with the triangles, of the movable marking-cord, the loose collar and pin for securing it at one end, and the slide and segmental guide at the other end, substantially as shown and described.

5. The combination of the stationary triangle, the movable triangle having a longitudinal slot in its base, and the set-screw for adjusting and holding said triangles in any desired relation to each other, substantially as shown and described.

6. The combination of the stationary triangle having the percentage-scale B arranged along its hypotenuse, the movable triangle having the number-bearing scale D arranged along its hypotenuse, and the markers, substantially as specified.

SYLVESTER J. TUCKER.

Witnesses:
  A. G. LYNE,
  SOLON C. KEMON.